(12) United States Patent
Allen

(10) Patent No.: US 12,509,877 B2
(45) Date of Patent: *Dec. 30, 2025

(54) FASTENER ALIGNMENT GUIDE, CONNECTOR AND METHOD

(71) Applicant: Simpson Strong-Tie Company Inc., Pleasanton, CA (US)

(72) Inventor: Dean Allen, Staffordshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/123,932

(22) Filed: Mar. 20, 2023

(65) Prior Publication Data

US 2023/0228080 A1 Jul. 20, 2023

Related U.S. Application Data

(63) Continuation of application No. 16/081,949, filed as application No. PCT/GB2017/050558 on Mar. 2, 2017, now Pat. No. 11,608,628.

(30) Foreign Application Priority Data

Mar. 3, 2016 (GB) ...................................... 1603732

(51) Int. Cl.
  *E04B 1/38* (2006.01)
  *E04B 1/26* (2006.01)
  *F16B 5/06* (2006.01)

(52) U.S. Cl.
  CPC ............ *E04B 1/388* (2023.08); *E04B 1/2612* (2013.01); *F16B 5/0621* (2013.01);
  (Continued)

(58) Field of Classification Search
  CPC .. E04B 1/40; E04B 1/2612; E04B 2001/2644; E04B 2001/2652;
  (Continued)

(56) References Cited

U.S. PATENT DOCUMENTS 1,406,723 A ‡ 2/1922 Caldwell ................. F16B 9/058
  403/232.1
3,912,211 A ‡ 10/1975 Topf ......................... A47G 1/20
  248/489

(Continued)

FOREIGN PATENT DOCUMENTS

AU   19879/83    4/1984
CH   603316 A5   8/1978
(Continued)

OTHER PUBLICATIONS

PCT International Search Report, PCT/GB2017/050558, May 11, 2017, 5 pages.
(Continued)

*Primary Examiner* — Patrick J Maestri
(74) *Attorney, Agent, or Firm* — Charles R. Cypher

(57) ABSTRACT

The present invention provides a fastener alignment guide comprising a generally planar body and an angled element arranged at an acute angle θ to the body, a first aperture arranged through the angled element and a second aperture arranged through the body, wherein the first aperture and the second apertures are aligned such that a fastener may be inserted progressively through the first and second apertures in use. The present invention also provides a slip-resisting fastener alignment guide comprising a body at least partially arranged in a first plane, the body comprising a first aperture for receiving, in use, at least a portion of a shank of a fastener; and a guidewall extending out of the first plane for guiding the fastener, in use, into the first aperture at an acute angle α to the first plane, wherein the guidewall comprises a first bearing edge or surface upon which an underside of a head of the fastener can bear in use, the body further comprises a second bearing edge or surface upon which the underside of the head of the fastener can bear in use, and the first bearing edge or surface and the second bearing edge or (Continued)

surface are each configured/arranged to resist movement, in use, of the fastener alignment guide relative to the fastener in a first direction parallel to the first plane.

The present invention also provides a method of forming the fastener alignment guide and slip-resisting fastener alignment guide.

15 Claims, 9 Drawing Sheets

(52) U.S. Cl.
CPC ............... *E04B 2001/2644* (2013.01); *E04B 2001/2652* (2013.01); *E04B 2001/389* (2023.08)

(58) Field of Classification Search
CPC .. E04B 2001/405; F16B 5/0621; F16B 5/025; F16B 15/00; B25B 23/005; B25C 3/006
See application file for complete search history.

(56) References Cited

U.S. PATENT DOCUMENTS

| | | | | |
|---|---|---|---|---|
| 4,230,416 A ‡ | 10/1980 | Gilb | ............. | F16B 9/052 248/300 |
| 4,291,996 A ‡ | 9/1981 | Gilb | ............. | F16B 9/058 403/14 |
| 4,480,941 A ‡ | 11/1984 | Gilb | ............. | E04B 1/2612 248/216.1 |
| 4,928,867 A ‡ | 5/1990 | Jensen | ............. | B25C 7/00 227/7 |
| 5,071,280 A ‡ | 12/1991 | Turner | ............. | F16B 9/058 403/283 |
| 5,217,317 A ‡ | 6/1993 | Young | ............. | E04B 7/063 403/14 |
| 5,419,649 A ‡ | 5/1995 | Gilb | ............. | F16B 9/052 403/231 |
| 5,603,580 A ‡ | 2/1997 | Leek | ............. | F16B 9/058 52/702 |
| 6,698,971 B1 ‡ | 3/2004 | Wilhelmi | ............. | E04B 1/2608 52/712 |
| 7,958,690 B2 ‡ | 6/2011 | Leek | ............. | E04H 9/14 52/712 |
| 9,920,514 B1 ‡ | 3/2018 | Brekke | ............. | E04B 7/022 |
| 10,072,412 B2 ‡ | 9/2018 | Brekke | ............. | E04B 1/2612 |
| 10,662,641 B2 ‡ | 5/2020 | Brekke | ............. | E04B 1/40 |
| 11,098,478 B2 ‡ | 8/2021 | Downs | ............. | B25C 7/00 |
| 11,137,010 B2 ‡ | 10/2021 | Muhn | ............. | F16B 15/0046 |
| 11,193,268 B2 ‡ | 12/2021 | Sasanecki | ............. | E04B 1/2612 |
| 2004/0096269 A1 ‡ | 5/2004 | Shahnazarian | ............. | E04B 1/2612 403/230 |
| 2006/0191233 A1 ‡ | 8/2006 | Tamlyn | ............. | E04B 1/2612 52/702 |
| 2008/0101855 A1 ‡ | 5/2008 | Lin | ............. | F16B 9/058 403/232.1 |
| 2009/0139153 A1 ‡ | 6/2009 | Hudson | ............. | E04G 21/1891 52/92.2 |

FOREIGN PATENT DOCUMENTS

| | | |
|---|---|---|
| DE | 2504816 A1 | 8/1975 |
| DE | 3641799 A1 | 6/1988 |
| DE | 29610381 U1 | 9/1996 |
| DE | 10051793 A1 | 5/2001 |
| EP | 1033450 A2 | 9/2000 |
| GB | 2541174 B | 5/2019 |

OTHER PUBLICATIONS

UK Intellectual Property Office Preliminary Examination Report Under Section 15A, GB1603732.7, Mar. 20, 2016, 2 pages.
UK Intellectual Property Office Examination Report Under Section 18(3), GB1603732.7, Apr. 27, 2016, 6 pages.
UK Intellectual Property Office Search Report Under Section 17(6), GB1603732.7, Oct. 15, 2018, 7 pages.
UK Intellectual Property Office Examination Report Under Section 18(3), GB1603732.7/ Oct. 15, 18, 5 pages.
UK Intellectual Property Office Examination Report Under Section 18(3), GB1603732.7, Sep. 26, 2019, 2 pages.
UK Intellectual Property Office Examination Report Under Section 18(3), GB1603732.7, Feb. 20, 2020, 2 pages.
PCT International Written Opinion, PCT/GB2017/050558, Sep. 8, 2017, 7 pages.
EP Communication Pursuant to Article 94(3) EPC, EP 17 709 760.7, EP 3432643, Dec. 4, 2020, 6 pages.

‡ imported from a related application

FASTENER ALIGNMENT GUIDE, CONNECTOR AND METHOD

This patent is a continuation of, and claims the benefit and priority of, co-pending U.S. patent application Ser. No. 16/081,949, filed Sep. 3, 2018, which issued as U.S. Pat. No. 11,608,628, which is hereby incorporated by reference, and U.S. patent application Ser. No. 16/081,949 is a 371 application of, and claims the benefit and priority of, international application PCT/GB2017/050558, filed Mar. 2, 2017, which has expired, which is hereby incorporated by reference, and International application PCT/GB2017/050558 claims foreign priority from GB application 2548090, filed Mar. 3, 2016, which is hereby incorporated by reference.

The present invention relates to a fastener alignment guide, a connector comprising the fastener alignment guide, and a method for fabrication of a fastener alignment guide.

Fasteners such as nails and screws are commonly used to form connections between members making up structures, for example the structural members of load bearing frames. The strength of any connection formed using one or more fasteners (for example, a screw or a nail) depends in part on the orientation of the fastener(s) relative to the force exerted on the connection. The strength of a connection may be critical to the safety and function of the structure of which the connection is a part. In construction of metal or timber framed buildings, for example, the direction and orientation of fasteners must always be consistent with the technical specifications of the frame to ensure that the connections between the structural members of the frame achieve the required resistance to expected loads.

Fasteners may be inserted directly into the members, or may pass through a suitably sized aperture in a connector forming a part of the connection. Fasteners are often installed perpendicular to the face of the members. However, in order to improve the strength of the connection in response to a particular type of load, for example shear loading, it may be preferable to insert the fasteners at non-perpendicular angles to the surface.

When fasteners are required to be installed at predefined angles to the surface, an installation aid is necessary in order to achieve the required angle. A template may be provided for checking the angle of a fastener as it is installed. However, if the template indicates that the angle is non-optimal, changing the angle of a fastener is difficult once installation has begun and may result in damage to the member in which the fastener is being installed.

Various installation tools are available which are costly and must be transported from place to place by the installer. For example, it is known to use a "pocket screw jig" in the form of a solid block comprising one or more angled tunnel-like apertures.

Other secondary machined parts that can be used to align the fasteners at the required angle are also available. However, these can also be costly and take additional time to install.

US20090139153 describes a construction device for spacing and alignment of structural members or other objects to be affixed. The device comprises a fastener guide.

There is a need to provide a fastener alignment guide with low production and raw material costs that is suitable for high volume production.

U.S. Pat. No. 4,291,996 describes a nail-angling device formed by bending a tab of material out of the plane of a connector. U.S. Pat. No. 5,603,580 describes a fastener-angling device formed by cutting a slit in a sheet metal connector and pressing the material adjacent to the slit such that it forms a half cone shape.

There is a need to provide a fastener alignment guide which ensures accurate alignment of the fastener and is quick and simple to install. There is also a need to provide a fastener alignment guide which has improved distribution of loads and resistance to differential displacement (slippage) between the connector and the structural member.

According to a first embodiment, the present invention provides a fastener alignment guide comprising;
a generally planar body; and
an angled element arranged at an acute angle $\theta$ to the body;
a first aperture arranged through the angled element; and
a second aperture arranged through the body;
wherein the first aperture and the second apertures are aligned such that a fastener may be inserted progressively through the first and second apertures in use.

Also provided is a method of forming a fastener alignment guide comprising the steps of:
forming a first aperture in a first portion of a piece of sheet metal;
forming a second aperture in the piece of sheet metal; and
bending the first portion out of the plane of the piece of sheet metal such that the first portion is arranged at an acute angle $\theta$ to the body, and the first aperture and the second apertures are aligned such that a fastener may be inserted progressively through the first and second apertures, in use.

To construct a connection using the fastener alignment guide of the first embodiment of the present invention the fastener is simply inserted through the aligned apertures, which ensure the proper angular alignment of the fastener. The fastener alignment guide may be integrally formed with a connector, such that no additional components or tools are required to install the fastener in the correct alignment relative to the connector. The fastener alignment guide of the first embodiment may also provide more even distribution of loads applied to the fastener in use.

According to a second embodiment, the present invention provides a slip-resisting fastener alignment guide comprising;
a body at least partially arranged in a first plane, the body comprising a first aperture for receiving, in use, at least a portion of a shank of a fastener; and
a guidewall extending out of the first plane for guiding the fastener, in use, into the first aperture at an acute angle $\alpha$ to the first plane; wherein
the guidewall comprises a first bearing edge or surface upon which an underside of a head of the fastener can bear in use;
the body further comprises a second bearing edge or surface upon which the underside of the head of the fastener can bear in use; and
the first bearing edge or surface and the second bearing edge or surface are each configured/arranged to resist movement, in use, of the fastener alignment guide relative to the fastener in a first direction parallel to the first plane.

Also provided is a method of forming a slip-resisting fastener alignment guide comprising the steps of:
forming a piece of sheet metal comprising a guidewall arranged at an acute angle $\alpha$ to a first plane, wherein;
the first plane is defined by a body of the piece of sheet metal; and the guidewall comprises a first bearing edge or surface upon which an underside of a head of a fastener can bear in use; and forming a second bearing edge or surface upon which the underside of the head of the fastener can bear in use; wherein the first bearing edge or surface and the second bearing edge or surface are each configured/arranged to resist movement, in use, of the fastener alignment guide relative to the fastener a first direction parallel to the first plane.

The fastener alignment guide according to the second embodiment of the present invention may be used in a connector aligned such that the at least a portion of applied load in the connection is exerted in the first direction. The fastener alignment guide according to the second embodiment of the present invention reduces the possibility of differential displacement of the connector in such a connection. The provision of a second bearing edge or surface configured/arranged to resist movement of the fastener alignment guide relative to the fastener in a direction parallel to the body, rather than a single point of contact between the fastener head and the upper face of the body, results in a more even distribution of applied loads within the connection, avoiding eccentric loads along the axis of the fastener and reducing the possibility of stress concentrations within the fastener leading to differential displacement.

The present invention therefore seeks to provide a fastener alignment guide which has low production and raw material costs and is suitable for high volume production, provides even load distribution and reduces differential displacement of connectors.

The present disclosure also provides a connector comprising a fastener alignment guide according to any embodiment of the present invention.

Preferred embodiments of the present invention will now be described by way of example only with reference to the accompanying drawings, in which:

FIG. 6b is further schematic perspective view of the connector of FIG. 6a;

FIG. 7b is a further schematic perspective view of the connector of FIG. 7a;

FIG. 8b is a further schematic perspective view of the connector of FIG. 8a;

Figure 1:
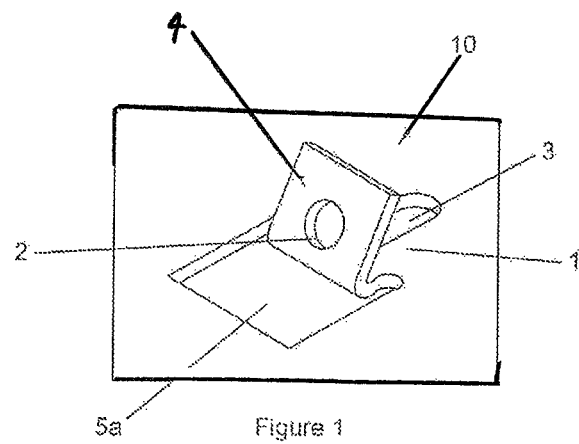
FIG. 1 is a schematic perspective view of a fastener alignment guide according to a first embodiment of the present invention.
Figure 2A:
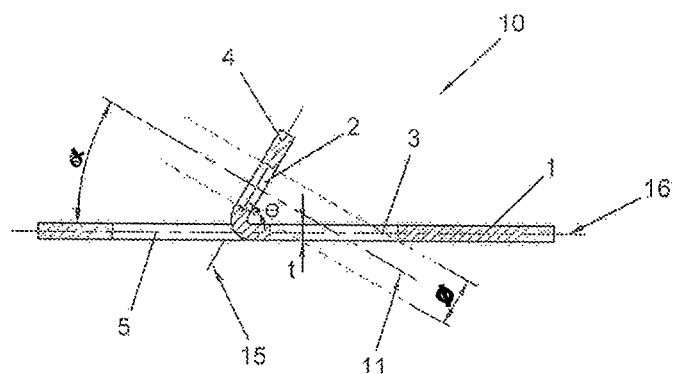
FIG. 2a is a schematic cross section view of the fastener alignment guide of FIG. 1.
Figure 2B:
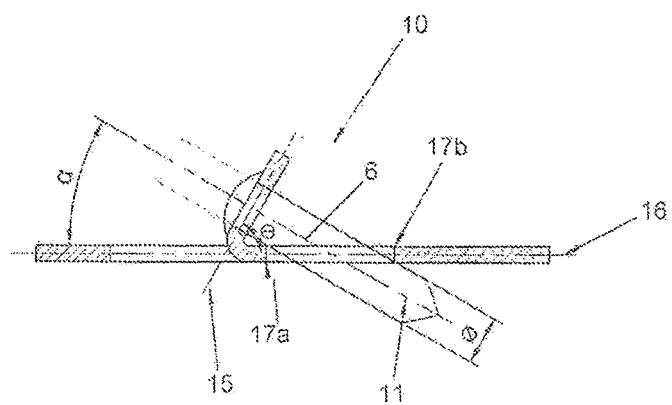
FIG. 2b is a schematic cross section view of the fastener alignment guide of FIG. 2a in use.
Figure 3:
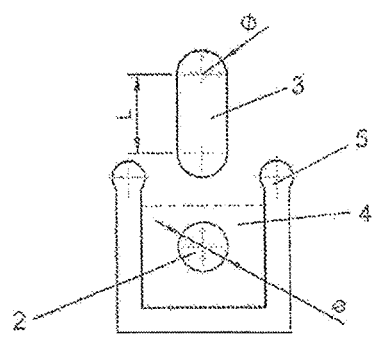
FIG. 3 is a schematic top elevation view of a sheet metal blank for the formation of the fastener alignment guide of FIGS. 2a and 2b.

Referring first to FIGS. 1 to 3, there is illustrated a fastener alignment guide 10 according to a first aspect of a first embodiment of the present invention. The fastener alignment guide 10 comprises a body 1 formed from sheet metal and an angled element 4 bent out of the body. The angled element 4 comprises a first aperture 2, which is a through-hole for receiving a portion of the shank of a fastener 6 in use.

The angled element 4 and the first aperture 2 are arranged in a first plane 15. The first plane 15 is at an acute angle θ to the body 1, which is substantially planar and is arranged in a second plane 16.

The first aperture 2 has a diameter ø and is therefore configured to receive in use a fastener 6 having a shank of diameter ~ø, where ~ø is marginally smaller than diameter ø of the first aperture 2, such that the fastener 6 is received in the first aperture 2 but is not a push- or interference-fit in the aperture.

A fastener alignment axis 11 is defined by the first aperture 2. The fastener alignment axis 11 is the axis on which the central axis of a fastener having a shank of diameter ~ø will be aligned when received in the first aperture 2, i.e. the fastener alignment axis 11 is a central axis of the first aperture 2. It passes through the centre of the first aperture 2, parallel to the walls of the first aperture 2 and is perpendicular to the first plane 15. The fastener alignment axis 11 is arranged at acute angle α to the body 1 and is perpendicular to the angled element 4.

The body 1 comprises a second aperture 3. The second aperture 3 is a through-hole for receiving a portion of the shank of the fastener 6 in use and is configured to reduce the possibility of misalignment of the fastener 6 on installation. The first aperture 2 and the second aperture 3 are aligned such that the shank of fastener 6 can be progressively inserted through the first aperture 2 and then the second aperture 3 such that when installed it is received within both the first and second apertures 2, 3 simultaneously.

The fastener alignment axis 11 of the first aperture 2 passes through a centre point of second aperture 3. The centre point is the midpoint of the second aperture along its length, width and depth. The second aperture 3 has a width substantially equal to ø. The second aperture 3 is in the form of an elongate slot with a middle portion having a constant width ø, and semi-circular ends. The middle portion has a length L and each end portion has a length of ø/2. The body 1 has a thickness t and the second aperture 3 has a total length l substantially equal to:

$$t/\tan\alpha + \text{ø}/\sin\alpha$$

Therefore, because the fastener 6 is aligned at angle of α to the second plane and has diameter ~ø, the fastener 6 cannot pass through both the first aperture 2 and the second aperture 3 unless its central axis is substantially coincident with the fastener alignment axis 11. The skilled person will understand that the formula for the length of the aperture may be restated to define the total length l with respect to angle θ.

As shown in FIG. 2b, the second aperture 3 comprises a proximal end 17a (proximal to the first aperture 2) and a distal end 17b (distal to the second aperture 2). In use, when a fastener 6 having a shank of diameter ~ø is inserted into the fastener alignment guide 10 it passes through the first aperture 2, which is configured to initially align the shank of the fastener with the fastener alignment axis 11. The shank of the fastener 6 may then contact the proximal end 17a at its upper edge, thereby guiding the shank through the second aperture 3 in line with the fastener alignment axis 11 such that the shank of the fastener also contacts or approaches a lower edge of the distal end 17b. The lateral alignment of the fastener is ensured by the width of the second aperture 3, which is equal to the width of the first aperture 2.

Preferably, the fastener alignment guide 10 may be formed as an integral part of a sheet metal connector 8, for example a joist hanger, bracket, portal frame connector or other connector for use in the construction of a frame for a building. As shown in FIGS. 4 to 8, one or more connectors 8, 18, 28, 38 comprising one or more fastener alignment guides 10 may be used to form connections between members 7 in structures, or to fasten a connector 8 to a single member.

Figure 6A:
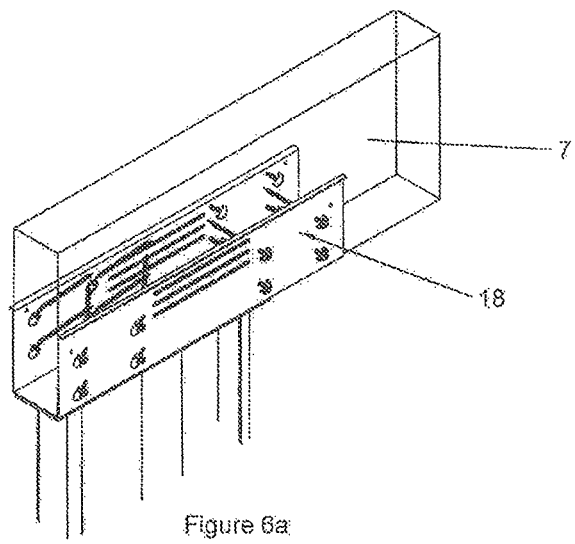
FIG. 6a is a schematic perspective view of a further connector comprising a plurality of fastener alignment guides according to a first embodiment of the present invention in use.
Figure 6B:
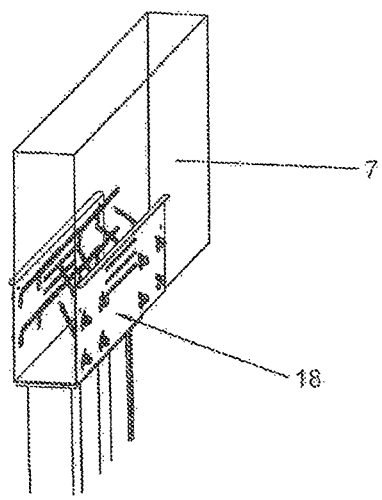
Figure 7A:
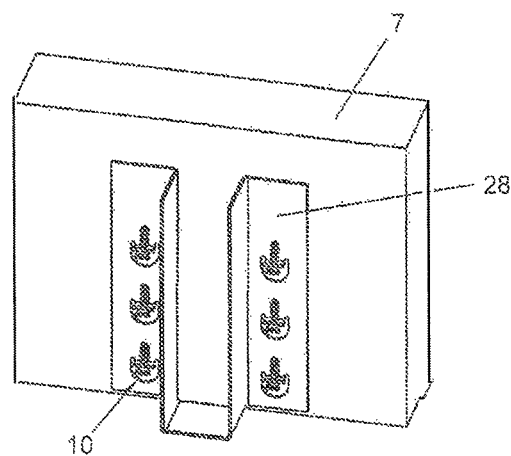
FIG. 7a is schematic perspective view of a yet further connector comprising a plurality of fastener alignment guides according to a first embodiment of the present invention in use.
Figure 7B:
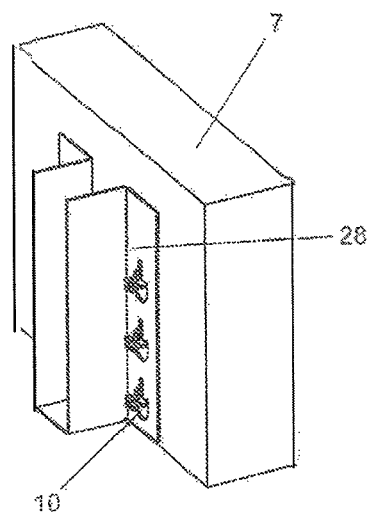
Figure 8A:
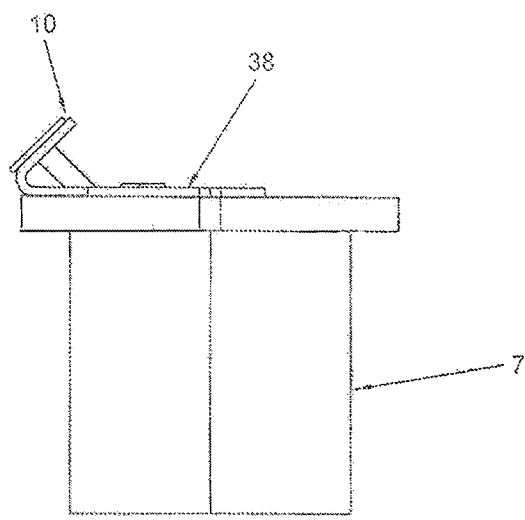
FIG. 8a is schematic perspective view of a yet further connector comprising a plurality of fastener alignment guides according to a first embodiment of the present invention in use.
Figure 8B:
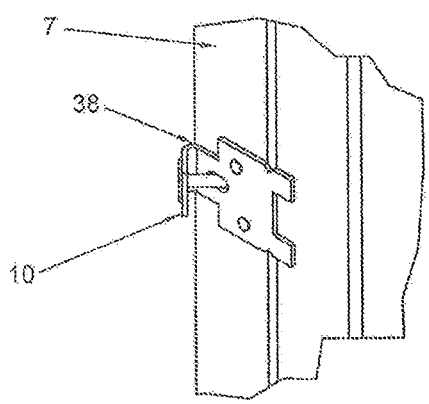

The fastener alignment guide(s) 10 may be configured to align the fasteners in the optimal directions for resisting the applied loads in any particular application, for example lateral loading in the header of a portal frame, as shown in FIGS. 6a and 6b, or the vertical loads in a joist hanger, as shown in FIGS. 7a and 7b.

To form the fastener alignment guide 10, the first aperture 2 of diameter ø is formed in a first portion of a piece of sheet metal. A second aperture 3 in the form of an elongate slot is also formed in the body 1 of the piece of sheet metal. A generally u-shaped channel 5 is formed in the sheet metal around the first portion, as shown in FIG. 3. The first portion is then bent out of the plane of the body of the piece of sheet metal (the second plane) until the first portion is arranged at an acute angle θ to the body 1, leaving an opening 5a in the sheet metal. The first portion thereby forms the angled element 4. The first aperture 2 and the second aperture 3 are aligned such that a fastener 6 may be inserted progressively through the first and second apertures 2, 3 in use, as shown in FIG. 2b. The first and second apertures are sized and arranged as described above.

Whilst preferred aspects of the first embodiment of the present invention have been described above and illustrated in the drawings, these are by way of example only and are non-limiting. It will be appreciated by those skilled in the art that many alternatives are possible within the ambit of the invention. In the following, like features have been referenced with like reference numerals. In each case, only the differences between the further aspect of the first embodiment and the illustrated aspect described above are described. For the avoidance of doubt, any of the features of any one of the following alternative aspects of the first embodiment may be combined with any one or more features of any one or more other of the preferred or alternative aspects to form a further alternative aspect of the present invention.

In the illustrated aspects of the first embodiment, the angled element 4 is integral with the body 1 and is formed by bending a portion of the body. In alternative aspects, the angled element may be welded or otherwise attached to the body.

In the illustrated aspects of the first embodiment, the first aperture 1 is a through hole whose sides are perpendicular to the angled element 4. The angled element 4 is therefore arranged in the first plane 15. In alternative aspects, the first aperture 1 may be a through hole whose sides and/or central axis 11 are non-perpendicular to the angled element 4. In these aspects, the first aperture 2 is arranged in the first plane 15 and is configured such that the fastener alignment axis is at angle α to the body 1 and the angled element 4 may be arranged out of the first plane 15. In any aspect, the angled element 4 may be non-planar, for example it may be curved.

In any aspect of the first embodiment, the walls of first aperture 2 need not be parallel to the fastener alignment axis 11. For example, if the fastener 6 has a head comprising an angled underside, the walls of the first aperture may be arranged at a complementary angle such that the shank of the fastener received in the apertures in use is aligned with the fastener alignment axis 11.

Figure 4:
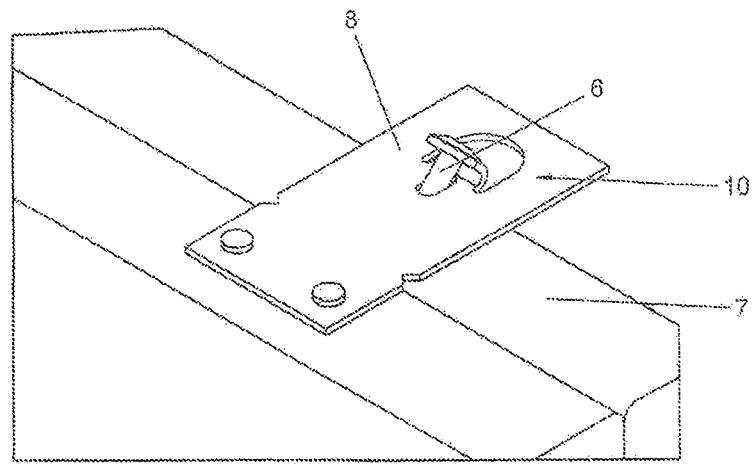
FIG. 4 is schematic perspective view of a connector comprising a fastener alignment guide according to a first embodiment of the present invention in use.
Figure 5:
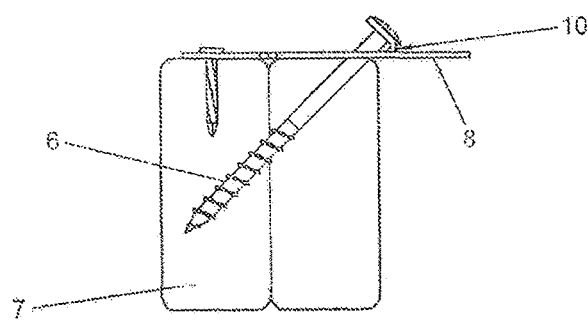
FIG. 5 is a schematic cross section view of the connector of FIG. 4 in use.

As illustrated in FIGS. 1 to 3, the channel 5 is formed such that the angled element 4 has a generally rectangular outline. In alternative embodiments, the angled element 4 may be formed with a rounded outline as shown in FIG. 4. Any other suitable shape of the angled element 4 may be adopted, for example the angled element 4 may be generally triangular. In yet further embodiments, the angled element 4 may be formed from by folding up a tab of material protruding from an edge of the body 1, rather than by forming a channel 5 in the body.

In the illustrated embodiments, the first aperture 2 is in the form of a circle or an octagon. In further alternative embodiments, the first aperture 2 may take any other form, for example a hexagon or a square. The skilled person will understand that the term "diameter" used in respect of the first aperture is to be understood to refer to equivalent dimensions for alternative shapes, e.g. width if square.

In the illustrated embodiments, the second aperture 3 is in the form of an elongate slot with a middle portion having a constant width and semi-circular ends. In alternative embodiments, this slot may take other forms. For example, the slot may be generally rectangular, or rectangular with rounded corners. In yet further embodiments, the second aperture 3 may have a width wider than ø or a non-uniform width.

The skilled person will understand that relative dimensions of the apertures and other measurements are subject to the usual manufacturing tolerances. The skilled person will further understand that in applications where less accurate alignment of the fastener is required, the second aperture 3 may be in the form of an elongate slot, or other aperture, with dimensions other than those of the illustrated aspects, such that the second aperture 3 acts as a guide element for the fastener but accommodates for a broader range of fastener alignments. For example, the second aperture 3 may be longer than the described length, such that only one point of contact may be made with the shank of the fastener 6 during insertion.

Figure 9:
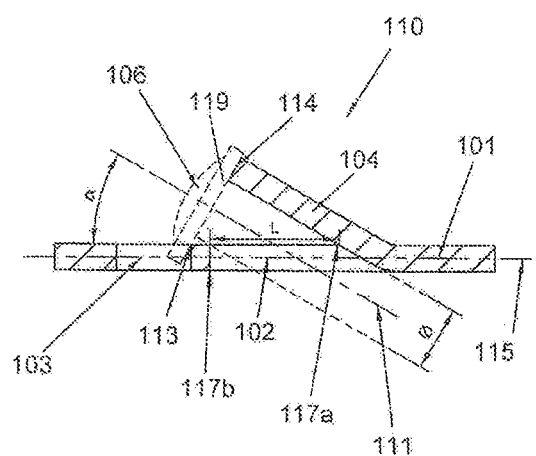
FIG. 9 is a schematic cross section view of a fastener alignment guide according to a second embodiment of the present invention.
Figure 10:
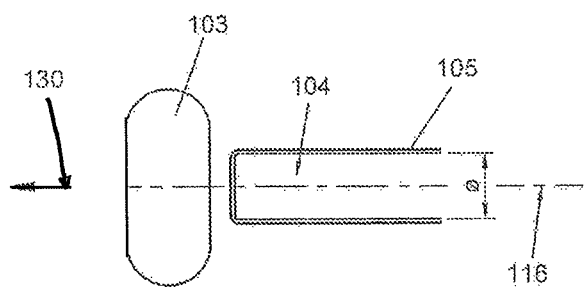
FIG. 10 is a schematic top elevation view of a sheet metal blank for the formation of the fastener alignment guide of FIG. 9.
Figure 11A:
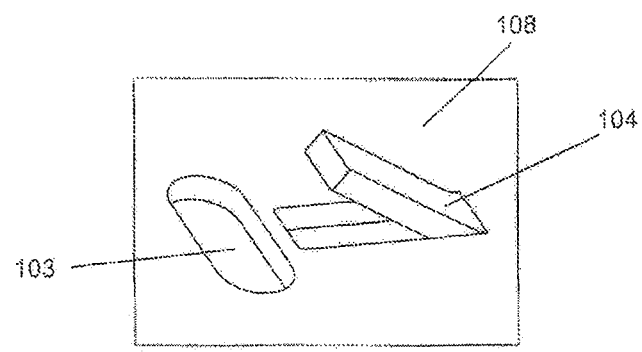
FIG. 11a is a schematic perspective view of the fastener alignment guide of FIG. 9.
Figure 11B:
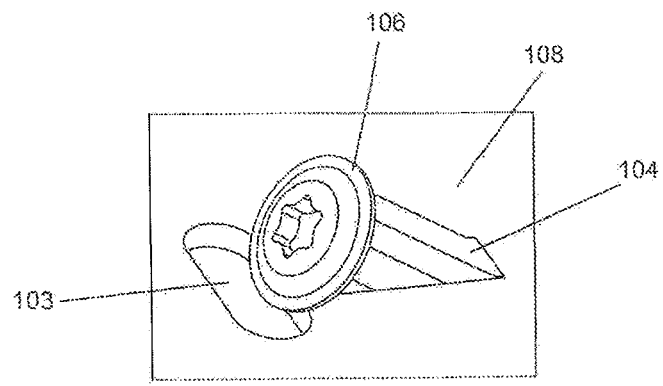
FIG. 11b is a further schematic perspective view of the fastener alignment guide of FIG. 11a in use.

Referring to FIGS. 9 to 11, there is illustrated a slip-resisting fastener alignment guide 100 according to a first aspect of a second embodiment of the present invention. The fastener alignment guide 100 comprises a body 101 arranged in a first plane 115. The body 101 is generally planar and is formed from sheet metal. The body comprises a first aperture 102 which is a through-hole for receiving, in use, at least a portion of a shank of a fastener 106 (shown in dotted lines in FIG. 9). The fastener 106 comprises a head having a generally planar underside 119 and a shank having a central axis, the central axis being generally perpendicular to the generally planar underside 119.

The fastener alignment guide 100 further comprises a guidewall 104. The guidewall 104 is integral to the body 101 and is formed by bending a portion of the body 101 out of the first plane 115 at an acute angle α, thereby forming the first aperture 102. The first aperture 102 has a width ø and is therefore configured to receive in use a fastener 106 having a shank of diameter ~ø, where ~ø is marginally smaller than diameter of the first aperture 102, such that the fastener 106 is received in the aperture 102 but is not a push- or interference-fit in the aperture 102.

A fastener alignment axis 111 may be defined through the first aperture 102. The fastener alignment axis 111 is the axis on which the central axis of a fastener having a shank of diameter ~ø will be aligned when received in the first aperture 102, the shank of the fastener 106 bearing against the underside of the guidewall 104. The fastener alignment axis 111 is parallel to the guidewall 104 and is arranged at an acute angle α to the first plane. The opening of the first aperture 102 at the upper face of the body 101 has a length L of approximately ø/sin α. A second plane 116 may be defined as being perpendicular to the first plane 115, the fastener alignment axis 111 being arranged in the second plane 116 and at an acute angle to the first plane 115.

The guidewall 104 comprises a bearing surface 114 upon which the underside 119 of the head of the fastener 106 can bear in use. The bearing surface 114 is at the distal end of the guidewall 104 from the body 101. It is generally planar and is perpendicular to the fastener alignment axis 111. The body 101 further comprises a stop in the form of a second aperture 103 comprising a linear bearing edge 113 upon which the underside 119 of the head of the fastener 106 can bear in use. In use, a distal portion of the fastener head is received in the second aperture 103 such that the underside 119 of the fastener head may bear upon the bearing edge 113.

The bearing surface 114 and the bearing edge 113 are both arranged on a third plane which is perpendicular to the fastener alignment axis 111. They are perpendicular to the second plane 116 and therefore are each configured/arranged to block movement, in use, of the fastener alignment guide relative to the fastener in a first direction 130 which is parallel to the first plane 115 and aligned with the fastener alignment axis 111. The guidewall 104 is therefore also aligned with the first direction 130. The bearing surface 114 and the bearing edge 113 each extend an equal distance on either side of the second plane 116 such that load is evenly distributed across the width of the fastener head in use. Further, the bearing surface 114 and the bearing edge 113 transect the second plane 116 on opposing sides of the fastener alignment axis 111 such that loads transmitted in the first direction 130 are distributed between the bearing surface 114 and the bearing edge 113.

As shown in FIG. 9, the first aperture 102 comprises a proximal end 117a (proximal to the guidewall 104) and a distal end 117b (distal to the guidewall 104). In use, when a fastener 106 having a shank of diameter ~ø is inserted into the fastener alignment guide 100 it passes through the first aperture 102, guided by the guidewall 104 and contacts the proximal end 117a, thereby guiding the shank through the first aperture 102 in line with the fastener alignment axis 111 such that the shank of the fastener also contacts or approaches an upper edge of the distal end 17b. The lateral alignment of the fastener is ensured by the width of the first aperture 102, which is marginally wider than the diameter of the shank of the fastener.

Whilst preferred aspects of the second embodiment of the present invention have been described above and illustrated in the drawings, these are by way of example only and are non-limiting. It will be appreciated by those skilled in the art that many alternatives are possible within the ambit of the invention. In each case, only the differences between the further aspect of the second embodiment and the illustrated aspect described above are described. For the avoidance of doubt, any of the features of any one of the following alternative aspects of the first embodiment may be combined with any one or more features of any one or more other of the preferred or alternative aspects to form a further alternative aspect of the present invention.

Figure 12:
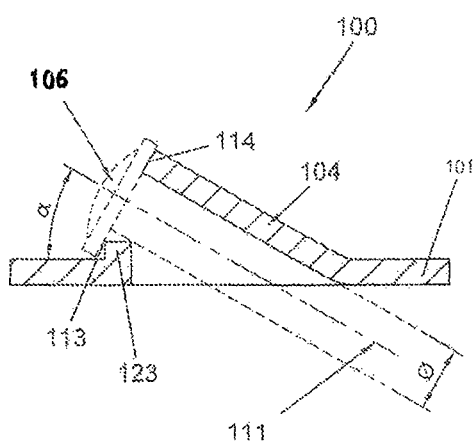
FIG. 12 is a schematic cross section view of a further fastener alignment guide according to a second embodiment of the present invention.

Referring to FIG. 12, there is illustrated a slip-resisting fastener alignment guide 100 according to a second aspect of the second embodiment of the present invention. In the following, like features have been referenced with like reference numerals. This aspect comprises a stop in the form of a protrusion 123 extending upwards from the body 101. The protrusion comprises the bearing edge 113, and in use, a distal portion of the fastener head is received behind the protrusion 123 (relative to the first aperture 102) such that the underside 119 of the fastener head may bear upon the bearing edge 113.

In the illustrated embodiments, the stop takes the form of a second aperture 103 or protrusion 123. The skilled person will understand that the stop is a barrier feature arranged transverse to the second plane 116 against which the underside 119 of the fastener head abuts to block, in use, movement of the fastener alignment guide 100 relative to the fastener in the first direction. In any aspect of the second invention, therefore, the stop may take alternative forms, such as a recess, embossment or ridge formed by folding or bending the body or by addition of a protruding element, for example by welding. Similarly, the skilled person will further understand that the bearing edge 113 may in any aspect of the second invention take the form of a second bearing surface configured that the underside 119 of the fastener head bears against the second bearing surface in use, the second bearing surface being arranged in the third plan. The bearing surface 114 may in any alternative aspects be a first bearing edge arranged in the third plane.

The guidewall 104 may, in any alternative aspects, be formed by welding or otherwise attaching a separate element to the body 101.

In any aspect of the second invention, the bearing edges or surfaces may be discontinuous and/or may be transverse, but not perpendicular to, the second plane. Similarly, the bearing edges or surfaces may extend uneven distances on either side of the second plane. Preferably, both of the bearing surfaces or edges are configured to abut the underside 119 of the fastener head evenly across its width.

In the illustrated embodiments, the guidewall is substantially planar and is arranged at angle α to the first plane. In alternative aspects of the second embodiment, the guidewall may extend at a different angle or take an alternative shape, for example a curve, provided that the first bearing surface and the point of connection between the guidewall 104 and the rest of the body 101 is arranged on an axis at angle α to the first plane, such that it may guide the shank of the fastener 106 into the first aperture 102 at angle α to the first plane.

In the illustrated embodiments, the guidewall 104 comprises a planar face configured to guide the shank of the fastener into the first aperture 102 at angle α to the first plane. In alternative aspects of the second embodiment, the guidewall 104 may comprise a curved face, an edge, or a discontinuous face or edge configured guide the shank of the fastener 106 into the first aperture 102 at angle α to the first plane.

The skilled person will understand that in alternative aspects the fastener alignment guide may be used with a fastener with a head having a non-planar underside. If the underside of the head is curved or angled, first and second bearing surfaces/edges may be formed with a complementary curve or angle, provided that they remain transverse to the second plane such that they are each configured/arranged to block movement, in use, of the fastener alignment guide relative to the fastener in the first direction 130.

The skilled person will understand that relative dimensions of the apertures and other measurements are subject to the usual manufacturing tolerances. The skilled person will further understand that in applications where less accurate alignment of the fastener is required, the first aperture 102 may have dimensions other than those of the illustrated aspects, allowing for greater variation in the alignment central axis of the shank of the fastener after insertion.

Preferably, one or more fastener alignment guides 100 according to any aspect of the second embodiment may be formed as an integral part of a sheet metal connector 8, 18, 28, 38, for example a joist hanger, bracket, portal frame connector or other connector for use in the construction of a frame for a building, such as those shown in FIGS. 4 to 8.

In use, the fastener alignment guide 100 will preferably be aligned such that at least a component of the loading expected in a particular application will be aligned with the first direction 130.

To form the fastener alignment guide 100, the second aperture 103 is formed in a first portion of a generally planar piece of sheet metal. A generally u-shaped slot 105 is formed in a second portion of the piece of sheet metal to form a tab having a planar end face. The tab is bent out of the plane of the piece of sheet metal to an angle α relative to the plane of the piece, thereby forming the first aperture 102. The first and second apertures are sized and arranged as described above.

Whilst preferred aspects and embodiments of the present invention have been described above and illustrated in the drawings, these are by way of example only and are non-limiting. It will be appreciated by those skilled in the art that many alternatives are possible within the ambit of the invention.

Preferably, the fastener alignment guide is formed as an integral part of a sheet metal connector 8,18,28, 108, meaning that the fastener alignment guide and the connector from a piece of sheet metal without addition of extra material, for example without welding, gluing etc. In further alternative embodiments, the fastener alignment guide may be fabricated as a separate component, and subsequently connected to a larger component, for example a connector.

In the present application, relative geometrical and/or positional terms, for example "top" and "upper" are used with reference to the orientation of the fastener guides 10, 100 as shown in FIGS. 2 and 9. The skilled person will understand that such terms are purely used for ease of reference and do not limit the actual orientation of the fastener alignment guide in use. Further, the skilled person will understand that the term "proximal" is used to refer to the nearest part and the term "distal" is to be used to refer to the furthest part.

The fastener alignment guides of the illustrated embodiments are formed from a single piece of sheet metal, without the need for subsequent welding or other additive processes. They are formed by stamping, cutting, folding and/or otherwise deforming the sheet metal. Preferably, the fastener alignment guide of any embodiment may be formed as an integral part of a sheet metal connector for example a joist hanger, bracket, portal frame connector or other connector for use in the construction of a frame for a building. The term "metal" is to be understood to include alloys and metal composites. In alternative aspects, the fastener alignment guide may be formed from other materials, for example sheet plastic, composites or resins. The production of connectors and other construction components in sheet metal may result in lower manufacturing costs, lower raw materials costs and/or increased speed of manufacture than for cast components, making the use of sheet metal in such component more conducive to high volume production.

Although the body 1 of all of the illustrated embodiments is general planar, the skilled person will understand that the body 1 need not be entirely planar. Depending on the required application, the body may be curved or bent and may include, for example, embossments, flanges, protrusions or other additional features not shown in the illustrated embodiments.

Although the examples described in this specification relate to construction of load bearing frames, any of the fastener alignment features according to the present invention may be applied to any other connection requiring installation of a fastener, for example in the construction of furniture or low-load bearing applications in building construction such as fixing panels in place.

In the illustrated embodiments, the fasteners received in the fastener alignment guide in use are screws and/or nails. The skilled person will understand that the fastener alignment guide may equally be used to align bolts or any other fastener having a substantially linear shaft or shank.

The skilled person will understand that the steps of the methods of fabricating the fastener alignment guide may be carried out in any practical order, and that the method according to the first embodiment of the present invention is not limited to producing a fastener alignment guide with the specified dimensions, but may be a fastener alignment guide having the form of any aspect or embodiment of the present invention.

Each feature disclosed in this specification (including the accompanying claims and drawings), may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims and drawings), and/or all of the steps of any method or process so disclosed, may be combined in any combination, except combinations where at least some of such features and/or steps are mutually exclusive.

Accordingly, while many different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments. As such, the true scope of the invention is that as set out in the appended claims.

I claim:

1. A slip-resisting fastener alignment guide comprising;
a body at least partially arranged in a first plane, the body comprising a first aperture for receiving, in use, at least a portion of a shank of a fastener; and
a guidewall extending out of the first plane for guiding the fastener, in use, into the first aperture at an acute angle to the first plane; wherein
the guidewall comprises a first bearing edge or surface upon which an underside of a head of the fastener can bear in use;
the body further comprises a second bearing edge or surface upon which the underside of the head of the fastener can bear in use;
the first bearing edge or surface and the second bearing edge or surface are each configured/arranged to resist movement, in use, of the fastener alignment guide relative to the fastener in a first direction parallel to the first plane;
the body further comprises a stop configured/arranged to resist or block movement, in use, of the fastener alignment guide relative to the fastener in the first direction; and
the stop comprises a second, separate aperture for receiving a portion of the head of the fastener in use, the second bearing edge or surface comprising at least a portion of an edge or surface of the second, separate aperture.

2. A slip-resisting fastener alignment guide as claimed in claim 1 wherein the first bearing edge or surface and the second bearing edge or surface are each arranged substantially transverse to the first direction.

3. A slip-resisting fastener alignment guide as claimed in claim 1 wherein the guidewall comprises a portion of the body which is bent out of the first plane, thereby forming the first aperture.

4. A slip-resisting fastener alignment guide as claimed in claim 1 wherein the guidewall is arranged at an angle to the first plane.

5. A slip-resisting fastener alignment guide as claimed in claim 1 wherein the first bearing edge or surface comprises an end face or edge of the guidewall.

6. A slip-resisting fastener alignment guide as claimed in claim 1 wherein;
a fastener alignment axis is defined through the first aperture;
a second plane is defined perpendicular to first plane, the fastener alignment axis being arranged in the second plane and at an acute angle to the first plane and
the first bearing edge or surface and the second bearing edge or surface are configured such that load transfer between the fastener and the fastener alignment guide in use is equally balanced on either side of the second plane.

7. A slip-resisting fastener alignment guide as claimed in claim 1 in combination with a fastener.

8. A slip-resisting fastener alignment guide as claimed in claim 7 wherein the fastener comprises a head having a generally planar underside and a shank having a central axis, the central axis being generally perpendicular to the generally planar underside of the head.

9. A slip-resisting fastener alignment guide as claimed in claim 1 wherein the first bearing edge or surface and/or the second bearing edge or surface is straight.

10. A connector comprising a slip-resisting fastener alignment guide as claimed in claim 1.

11. A connector as claimed in claim 10 wherein the connector is formed from sheet metal.

12. A connector as claimed in claim 10 wherein the slip-resisting fastener alignment guide is formed as an integral part of the connector.

13. A connector as claimed in claim 12 wherein the connector is a joist hanger, bracket, angle bracket or portal frame connector or other connector for use in construction.

14. A method of forming a slip-resisting fastener alignment guide comprising the steps of:
forming a piece of sheet metal comprising a guidewall arranged at an acute angle to a first plane, wherein;
the first plane is defined by a body of the piece of sheet metal; and
the guidewall comprises a first bearing edge or surface upon which an underside of a head of a fastener can bear in use; and
forming a second bearing edge or surface upon which the underside of the head of the fastener can bear in use, wherein:
the first bearing edge or surface and the second bearing edge or surface are each configured/arranged to resist movement, in use, of the fastener alignment guide relative to the fastener a first direction parallel to the first plane;
the step of forming the second bearing edge or surface comprises forming a stop in the body; and
the stop is a second, separate aperture in the body.

15. A method of forming a slip-resisting fastener alignment guide as in claim 14 wherein the guidewall is formed by bending a portion of the body out of the first plane.

* * * * *